(No Model.)
G. W. BROWN.
STEAM ENGINE PRESSURE RECORDER AND SPEED INDICATOR.
No. 316,111. Patented Apr. 21, 1885.
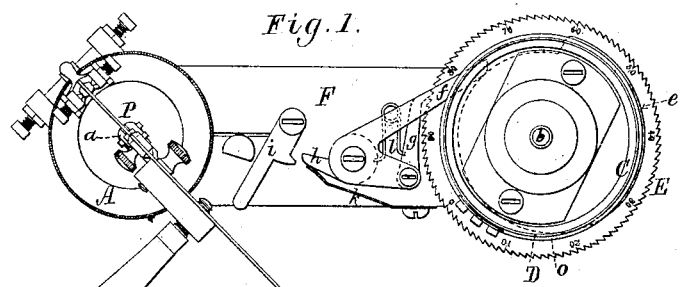
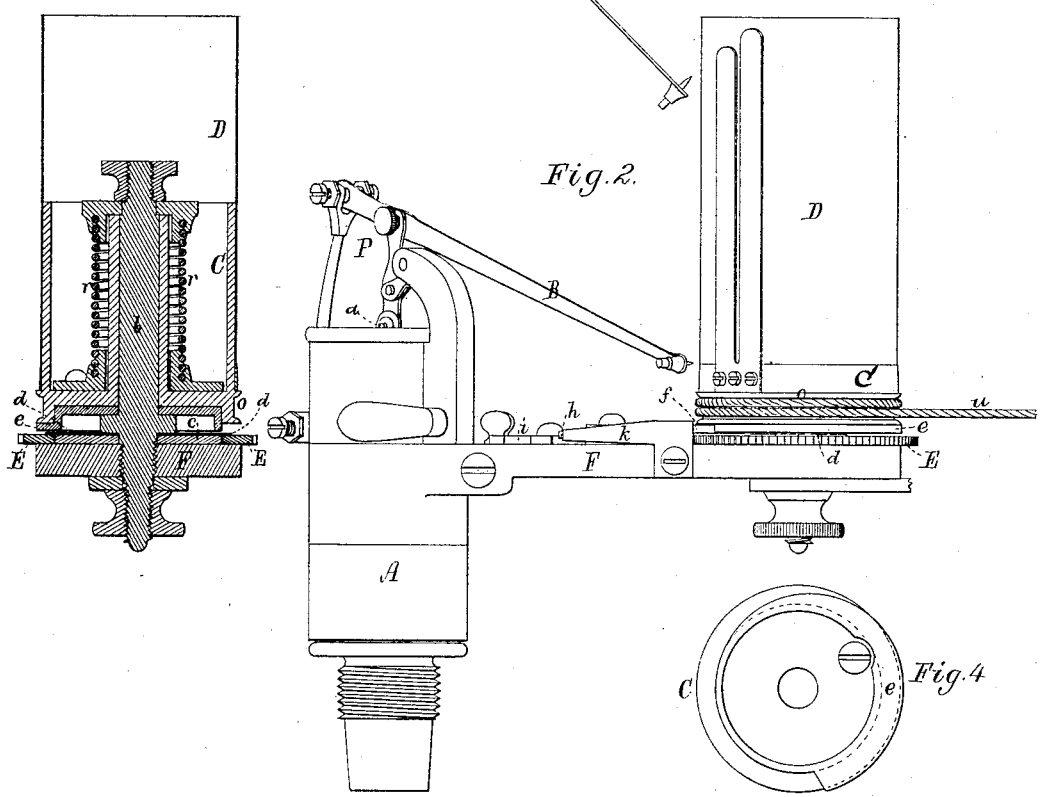
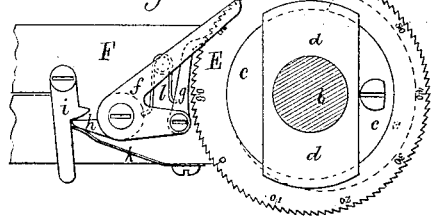
Witnesses.
S. N. Piper.
E. B. Pratt.
Inventor.
Gilman Weld Brown.
by R. H. Eddy att'y.

UNITED STATES PATENT OFFICE.

GILMAN WELD BROWN, OF WEST NEWBURY, ASSIGNOR TO THE CROSBY STEAM GAGE AND VALVE COMPANY, OF BOSTON, MASSACHUSETTS.

STEAM-ENGINE PRESSURE-RECORDER AND SPEED-INDICATOR.

SPECIFICATION forming part of Letters Patent No. 316,111, dated April 21, 1885.

Application filed August 11, 1884. (No model.)

*To all whom it may concern:*

Be it known that I, GILMAN WELD BROWN, of West Newbury, in the county of Essex, of the Commonwealth of Massachusetts, have invented a new and useful Improvement in Steam-Engine Pressure-Recorders and Speed-Indicators; and I do hereby declare the same to be described in the following specification and represented in the accompanying drawings, of which—

Figure 1 is a top view, and Fig. 2 a front elevation, of a pressure-recorder and speed-indicator provided with my invention. Fig. 3 is a vertical section taken through the reciprocating drum and its paper-carrier and their supporting-arm. Fig. 4 is an under side view of the drum, such figure showing the cam for operating the angular lever that carries the pawl for actuating the ratchet-annulus. Fig. 5 is a top view of such ratchet-annulus, its friction-spring, and operative lever and pawl, and certain parts adjacent thereto.

The steam-engine pressure-recorder to which my invention is applied is of the class or kind generally known by the name of the "steam-pressure indicator or recorder," one of such being described in the United States Patent No. 219,149, granted September 2, 1879, to George H. Crosby, it being to record or mark on a sheet of paper by means of a pencil a curved line indicative of the varying pressure in the cylinder of a steam-engine during a stroke of the piston thereof.

In the drawings, A denotes the steam-cylinder of the recorder; $a$, the piston-rod thereof; B, the marker-carrying lever; C, the reciprocating drum; D, its paper-carrier or sustaining sleeve, and P the parallel motion.

The nature of my invention is duly defined in the claims hereinafter presented, the purpose of it being to determine the speed of the piston of the steam-engine or the number of strokes such piston may make in a given period of time—as a minute, for instance. To this end there is fastened on the arm F, that supports the spindle $b$ of the reciprocating drum C, and below such drum, a disk, $c$, to which is applied concentrically a ratchet ring or annulus, E, provided at its periphery with one hundred or any suitable number of teeth, one hundred being a very convenient number for use. Upon the upper surface of the said annulus or ring there are divisions and numbers, as 0 10 20 30, &c., expressive of the number of teeth in any arc of the circumference of the ratchet-ring or flat annulus, extending from the zero of the scale. There projects from the spindle $b$, and over and upon the flat ratchet-annulus, a friction plate or spring, $d$, which is to prevent the ring from being accidentally revolved.

On the lower end of the drum C is a scroll-cam, $e$, against whose periphery the longer arm of an angular lever, $f$, rests, there being pivoted to the shorter arm of such lever a pawl, $g$, to engage with the teeth of the ring. The lever is fulcrumed to the arm F, and has a tooth, $h$, projecting back from it to engage with a lever-latch, $i$, fulcrumed to the said arm, and formed and arranged as represented. A spring, $k$, fixed to the arm F, bears against the said tooth, in order to force the longer arm of the lever against the periphery of the cam. The latch, when in engagement with the tooth, serves to hold the lever off or away from the cam when it may not be desirable to have the annulus revolved. A spring, $l$, presses the pawl up to the periphery of the ratchet-ring.

As the drum will be partially revolved during each downward or in stroke of the piston of the steam-engine, the scroll-cam $e$ will move the angular lever $f$ far enough for it to cause the pawl $g$ to turn the ring the angular distance of one tooth thereof, and therefore if the ring be set with its zero-division at the fixed end of the spring $k$, and the lever-latch be moved out of engagement with the tooth of the angular lever, such lever will at once be forced into contact with the periphery of the scroll-cam. As the drum may be reciprocated in a partial rotation by the cord $n$, attached to the piston cross-head or some other proper movable part of the steam-engine, and to the pulley $o$ of such drum, the ratchet-ring will be moved or turned the distance of a tooth of it for each downward or in stroke of the engine-piston. Therefore, by its divisions, such ring will indicate the number of such strokes occurring in the minute of time commencing at the starting of the ring. During each instroke of the piston, the cord $n$ will be pulled, so as to cause it to turn the drum one way, the return movement of the drum being effected by a spiral spring, r, applied to it and the spindle in the usual manner.

I herein make no claim to a steam-engine pressure-recorder and speed-indicator constructed as represented in the United States Patent No. 263,843, granted to the Crosby Steam Gage and Valve Company as assignee of myself, the inventor. In my present instrument, although the mechanism for recording the pressure of the steam is very like, if not substantially the same as, that shown in the said patent, the mechanism for indicating the speed of the steam-engine piston or number of its strokes is entirely different from anything described and shown in such patent, and in no respect performs the office of recording the said speed on paper, but simply indicates it, as described, by means of a rotary toothed annulus.

I claim in the steam-engine pressure-recorder and speed-indicator—

1. The combination of the divided ratchet-annulus, the arm of the recorder, the reciprocating drum, and the cam fixed to the bottom thereof, with an angular lever and its pawl, such lever being fulcrumed to the said arm and to operate with the cam, and such pawl being to engage with the ratchet-annulus, as set forth, and such lever and pawl having springs for forcing the former against the cam and the latter against the ratchet-annulus, all being substantially as represented.

2. The combination of the lever-latch, the divided ratchet-annulus, and the arm of the recorder, with the reciprocating drum, the cam fixed to the bottom of such drum, the angular lever and pawl and their operative springs, and a tooth projecting from the said lever, all being substantially and to operate as set forth.

3. The combination of the friction-spring and the spindle of the drum with the divided ratchet-annulus, the arm of the recorder, the reciprocating drum and its cam, and with the angular lever and pawl, all being substantially and to operate as set forth.

GILMAN WELD BROWN.

Witnesses:
R. H. EDDY,
E. B. PRATT.